(12) United States Patent
Wang et al.

(10) Patent No.: US 11,433,718 B2
(45) Date of Patent: Sep. 6, 2022

(54) UPGRADING METHOD AND APPARATUS FOR TIRE PRESSURE MONITORING MODULE AND TIRE PRESSURE SENSOR

(71) Applicant: AUTEL INTELLIGENT TECHNOLOGY CORP., LTD., Guangdong (CN)

(72) Inventors: Tao Wang, Guangdong (CN); Yong Wu, Guangdong (CN)

(73) Assignee: AUTEL INTELLIGENT TECHNOLOGY CORP., LTD., Shenzhen (CN)

(*) Notice: Subject to any disclaimer, the term of this patent is extended or adjusted under 35 U.S.C. 154(b) by 472 days.

(21) Appl. No.: 16/748,495

(22) Filed: Jan. 21, 2020

(65) Prior Publication Data
US 2020/0156422 A1    May 21, 2020

Related U.S. Application Data

(63) Continuation-in-part of application No. PCT/CN2018/094539, filed on Jul. 4, 2018.

(30) Foreign Application Priority Data

Jul. 25, 2017  (CN) .......................... 201710613174.9

(51) Int. Cl.
*B60C 23/04*     (2006.01)
*G01L 17/00*     (2006.01)
(Continued)

(52) U.S. Cl.
CPC ...... *B60C 23/0474* (2013.01); *B60C 23/0471* (2013.01); *G01L 17/00* (2013.01); *G06F 8/65* (2013.01); *G06F 9/44589* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 9,469,169 B1*  10/2016  Yu ........................ B60C 23/0471
2015/0054641 A1*  2/2015  Petrucelli ............ B60C 23/0408
340/447

(Continued)

FOREIGN PATENT DOCUMENTS

| CN | 102862450 A | * | 1/2013 |
| CN | 102862450 A |   | 1/2013 |

(Continued)

*Primary Examiner* — Andre J Allen

(57) ABSTRACT

Embodiments of the present invention relate to the technical field of vehicle electronics and disclose an upgrading method and apparatus for a tire pressure monitoring module and a tire pressure sensor. The method is applicable to a tire pressure sensor including a signal receiving module. The method specifically includes: controlling the signal receiving module to receive an upgrade file and save the upgrade file; and waking up a tire pressure monitoring module, and controlling the tire pressure monitoring module to read the saved upgrade file and upgrade the tire pressure monitoring module based on the upgrade file. The embodiments of the present invention can realize wireless upgrading of the tire pressure sensor, thereby improving the upgrading efficiency, reducing the upgrading costs, and improving the safety in upgrading of the tire pressure sensor.

20 Claims, 5 Drawing Sheets

S100 — A signal receiving module receives an upgrade file and saves the upgrade file S200 — The signal receiving module sends a trigger signal to a programming and upgrading module after saving the upgrade file; after receiving the trigger signal, the programming and upgrading module controls the tire pressure monitoring module to enter an upgrade mode; and the programming and upgrading module reads the upgrade file from the memory and upgrades the tire pressure monitoring module in the upgrade mode based on the upgrade file

(51) Int. Cl.
*G06F 8/65* (2018.01)
*G06F 9/445* (2018.01)

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC .................................................. 73/146–146.8
See application file for complete search history.

(56) References Cited

U.S. PATENT DOCUMENTS

| | | | |
|---|---|---|---|
| 2016/0101658 A1* | 4/2016 | Hongjing | B60C 23/0461 340/447 |
| 2016/0258830 A1 | 9/2016 | Lammers | |
| 2016/0303926 A1* | 10/2016 | Hongjing | B60C 23/0471 |
| 2021/0107325 A1* | 4/2021 | Wang | B60C 23/0479 |

FOREIGN PATENT DOCUMENTS

| | | | | |
|---|---|---|---|---|
| CN | 103587357 A | | 2/2014 | |
| CN | 105882329 A | | 8/2016 | |
| CN | 105904918 A | | 8/2016 | |
| CN | 205670294 U | | 11/2016 | |
| EP | 2669098 B1 | * | 8/2014 | ......... B60C 23/0418 |
| TW | 201623037 A | * | 7/2016 | ............ B60C 23/04 |

* cited by examiner

UPGRADING METHOD AND APPARATUS FOR TIRE PRESSURE MONITORING MODULE AND TIRE PRESSURE SENSOR

CROSS-REFERENCE

The present application is a continuation-in-part of International Patent Application No. PCT/CN2018/094540 filed on Jul. 4, 2018, which claims priority to Chinese Patent Application No. 201710613174.9 filed on Jul. 25, 2017, both of which are incorporated herein by reference in their entireties.

BACKGROUND

Technical Field

The present application relates to the technical field of vehicle electronics, and in particular, to an upgrading method and apparatus for a tire pressure monitoring module and a tire pressure sensor.

Related Art

Tire pressure monitoring system is a safety system for automatically monitoring a tire pressure of a vehicle in real time during driving and giving an alarm in the case of a flat tire and a low pressure to ensure the safely of driving. As a main constituent of the tire pressure monitoring system, a tire pressure sensor is responsible for an important task of obtaining data about environment inside a tire.

In the prior art, the tire pressure sensor can only be programmed and upgraded in a wired manner due to configuration of the tire pressure monitoring chip used therein. Therefore, the existing programming and upgrading technology is wired programming and upgrading. When the tire pressure sensor needs to be upgraded, the tire pressure sensor needs to be removed from the tire and connected to a programming and upgrading tool. In other words, the upgrading operation cannot be implemented in a wireless manner. Consequently, much manpower is required, and the tire may even be damaged during the removal process. The entire process is complex in operation and low in efficiency.

SUMMARY

A main technical problem to be resolved by embodiments of the present invention is to provide an upgrading method for a tire pressure monitoring module and a tire pressure sensor, to resolve the problem in the prior art that upgrading of a tire pressure monitoring module is implemented through wired programming requires complex operations.

To resolve the foregoing technical problems, a technical solution adopted by the embodiments of the present invention is to provide an upgrading method for a tire pressure monitoring module, applicable to a tire pressure sensor, where the tire pressure sensor includes a signal receiving module, a tire pressure monitoring module, a programming and upgrading module and a memory, the method including:
receiving, by the signal receiving module, an upgrade file in a wireless manner, and saving the upgrade file in the memory;
sending, by the signal receiving module, a trigger signal to the programming and upgrading module after saving the upgrade file;
controlling, by the programming and upgrading module after receiving the trigger signal, the tire pressure monitoring module to enter an upgrade mode; and
reading, by the programming and upgrading module, the upgrade file from the memory and upgrading the tire pressure monitoring module in the upgrade mode based on the upgrade file.

Optionally, the trigger signal is a wakeup signal for waking up the programming and upgrading module in a sleep mode.

Optionally, the method further includes: detecting, by the signal receiving module, a preset upgrading identifier from received data and determining the received data as the upgrade file; and
obtaining and saving, by the signal receiving module, a file size of the upgrade file after determining that receiving of the upgrade file is complete; and
the reading, by the programming and upgrading module, the upgrade the includes:
reading, by the programming and upgrading module, the upgrade file based on the file size of the upgrade file.

Optionally, the reading, by the programming and upgrading module, the upgrade file based on the file size of the upgrade file includes:
determining, by the programming and upgrading module, a number of times of reading based on the file size of the upgrade file and an amount of data the tire pressure monitoring module is able to upgrade each time, and reading upgrade data in the upgrade file successively based on the number of times of reading.

Optionally, the controlling, by the programming and upgrading module, the tire pressure monitoring module to enter an upgrade mode includes:
controlling, by the programming and upgrading module, the tire pressure monitoring module to power off;
sending, by the programming and upgrading module, an upgrade signal to the tire pressure monitoring module to cause the tire pressure monitoring module to enter the upgrade mode.

Optionally, the method further includes:
determining, by the programming and upgrading module, whether the upgrade file is valid; and
the upgrading, by the programming and upgrading module, the tire pressure monitoring module in the upgrade mode based on the upgrade file includes:
if the upgrade file is determined to be valid, upgrading, by the programming and upgrading module, the tire pressure monitoring module in the upgrade mode based on the upgrade file.

Optionally, the method further includes:
determining, by the programming and upgrading module, whether the upgrading of the tire pressure monitoring module is successful; and
if the upgrading fails, upgrading, by the programming and upgrading module, the tire pressure monitoring module again based on the upgrade file.

Optionally, the method further includes:
entering, by the programming and upgrading module, the sleep mode after upgrading the tire pressure monitoring module.

To resolve the foregoing technical problems, another technical solution adopted by the embodiments of the present invention is to provide an upgrading apparatus for a tire pressure monitoring module, including:
a signal receiving module, a memory connected to the signal receiving module, a programming and upgrading module connected to the signal receiving module and the memory and a tire pressure monitoring module connected to the programming and upgrading module, where the signal receiving module is configured to receive an upgrade file in a wireless manner and save the upgrade file in the memory;

the signal receiving module is configured to send a trigger signal to the programming and upgrading module after saving the upgrade file;

the programming and upgrading module is configured to control, after receiving the trigger signal, the tire pressure monitoring module to enter an upgrade mode; and the programming and upgrading module is configured to read the upgrade file from the memory and upgrade the tire pressure monitoring module in the upgrade mode based on the upgrade file.

Optionally, the trigger signal is a wakeup signal for waking up the programming and upgrading module in a sleep mode.

Optionally, the signal receiving module is configured to detect a preset upgrading identifier from received data and determine the received data as the upgrade file;

the signal receiving module is configured to obtain and save a file size of the upgrade file after determining that receiving of the upgrade file is complete; and the programming and upgrading module is specifically configured to:

read the upgrade file based on the file size of the upgrade file.

Optionally, the programming and upgrading module is specifically configured to:

determine a number of times of reading based on the file size of the upgrade file and an amount of data the tire pressure monitoring module is able to upgrade each time, and read upgrade data in the upgrade file successively based on the number of times of reading.

Optionally, the programming and upgrading module is specifically configured to:

control the tire pressure monitoring module to power off; and send an upgrade signal to the tire pressure monitoring module to cause the tire pressure monitoring module to enter the upgrade mode.

Optionally, the programming and upgrading module is configured to determine whether the upgrade file is valid; and the programming and upgrading module is specifically configured to:

if the upgrade file is determined to be valid, upgrade the tire pressure monitoring module in the upgrade mode based on the upgrade file.

Optionally, the programming and upgrading module is configured to determine whether the upgrading of the tire pressure monitoring module is successful; and if the upgrading fails, the programming and upgrading module is configured to upgrade the tire pressure monitoring module again based on the upgrade file.

Optionally, the programming and upgrading module is configured to enter the sleep mode after upgrading the tire pressure monitoring module.

Another embodiment of the present invention provides a computer program product, including a computer program stored on a non-volatile computer readable storage medium. The computer program includes a program instruction. When executed by a processor, the program instruction causes the processor to perform the upgrading method for a tire pressure monitoring module.

Another embodiment of the present invention provides a non-volatile computer readable storage medium, storing a computer executable instruction. When executed by one or more processors, the computer executable instruction causes the one or more processors to perform the upgrading method for a tire pressure monitoring module.

The embodiments of the present invention provide an upgrading method for a tire pressure monitoring module and a tire pressure sensor, where an upgrade file is received in a wireless manner and saved, and the tire pressure monitoring module is controlled to enter an upgrade mode, so as to upgrade the tire pressure monitoring module based on the upgrade file. Different from the prior art, the embodiments of the present invention adopt wireless upgrading instead of the existing wired upgrading to simplify the upgrading process and avoid complex operations which may damage the tire, thereby improving the upgrading efficiency, reducing the upgrading costs and improving the safety in upgrading of the tire pressure sensor.

BRIEF DESCRIPTION OF THE DRAWINGS

To describe the technical solutions in the embodiments of the present application more clearly, the accompanying drawings required for illustrating the embodiments of the present application will be introduced briefly in the following. Apparently, the accompanying drawings in the following description are merely some embodiments of the present application, and a person of ordinary skill in the art may obtain other accompanying drawings based on these accompanying drawings without creative efforts.

DETAILED DESCRIPTION

Figure 1:
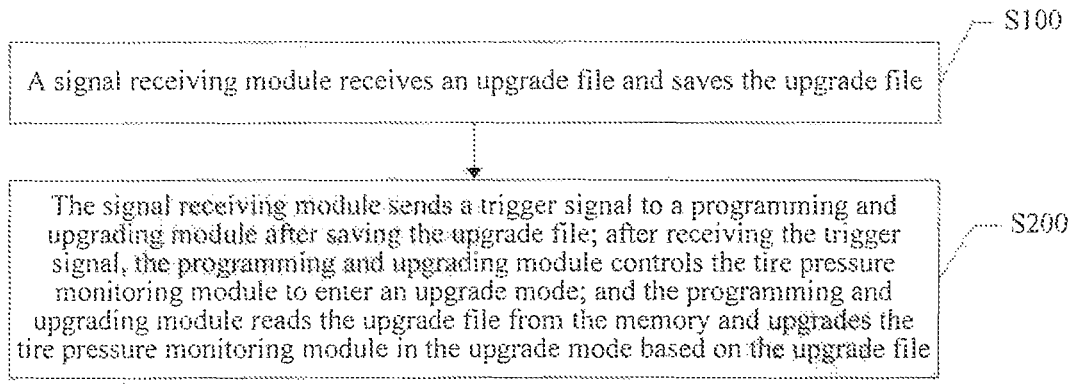
FIG. 1 is a schematic flowchart of an upgrading method for a tire pressure monitoring module according to an embodiment of the present invention.

The following further describes the present invention in detail with reference to the accompanying drawings and embodiments. It should be understood that the specific embodiments described herein are merely intended to explain the present invention but are not intended to limit the present invention.

Embodiments of the present invention are directed to resolving a problem that an existing tire pressure sensor can only be programmed and upgraded in a wired manner due to configuration of a tire pressure monitoring module used therein. The tire pressure monitoring module is generally a tire pressure monitoring chip, such as a micro-controller having a rewritable memory. Specifically, a programming and upgrading module is integrated in the tire pressure sensor. First, the sensor obtains a programming upgrade file and then saves the programming upgrade file in a storage unit. After the saving is complete, the sensor instructs the programming and upgrading module to read the programming upgrade file in the storage unit and then perform programming and upgrading of the tire pressure monitoring module of the sensor. The programming and upgrading module can meet system requirements by using low-performance components, thereby achieving wireless upgrading without greatly increasing the costs, and effectively resolving the problems such as low efficiency of programming and upgrading and potential safety risks caused by complex operations, in some other embodiment, the programming and upgrading module can also be a software module stored in the tire pressure monitoring module.

An application scenario involved in the embodiments of this application is introduced first.

The tire pressure sensor may measure information such as pressure, temperature and acceleration of a tire through the tire pressure monitoring module. Generally, after the tire pressure monitoring module is started up or when the tire pressure monitoring module is working, a storage module such as a flash configured in the tire pressure monitoring module is not allowed to be erased, and only when the tire pressure monitoring module is in an upgrade mode, the flash therein is allowed to be erased. In this case, an upgrade file received by the tire pressure sensor through a signal receiving module cannot be written into the tire pressure monitoring module, and upgrading of the tire pressure monitoring module cannot be implemented. The tire pressure sensor needs to trigger the tire pressure monitoring module to enter the upgrade mode through an external apparatus. This may be realized by connecting the tire pressure sensor to the external apparatus in a wired manner or by detaching the tire pressure sensor from a vehicle and then using the external apparatus to trigger the tire pressure monitoring module to enter the upgrade mode. Such implementations all increase the complexity of upgrading operations of the tire pressure sensor.

Based on the foregoing application scenario, embodiments of the present application provide a tire pressure sensor and an upgrading method for a tire pressure monitoring module.

Figure 13:
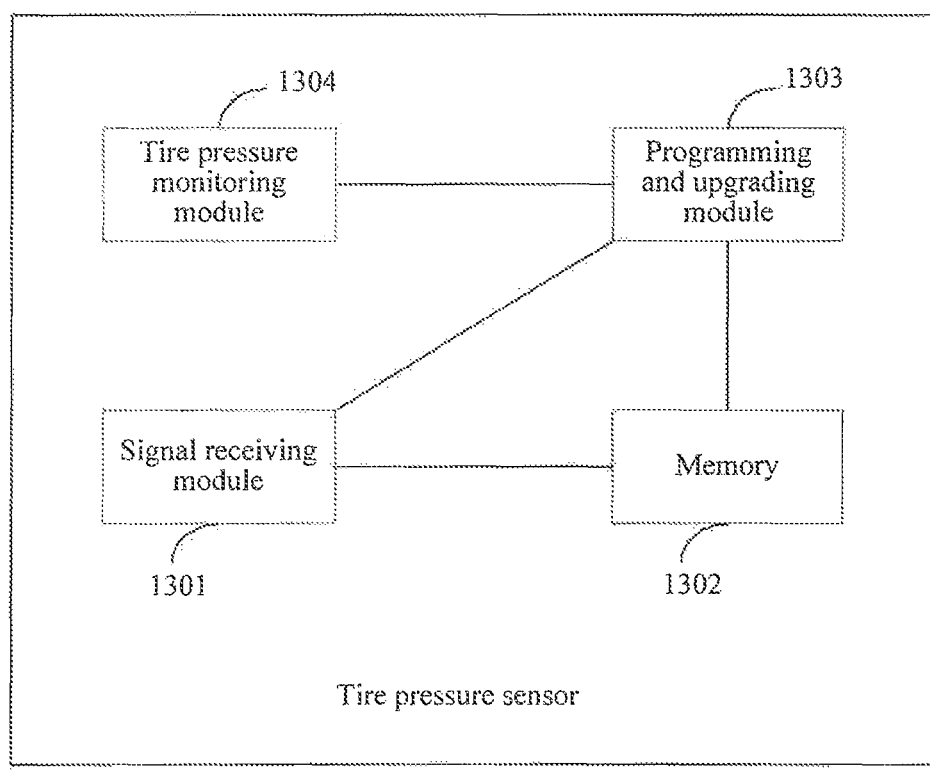
FIG. 13 is a hardware structural diagram of a tire pressure sensor according to another embodiment of the present invention.

FIG. 13 is a structural diagram of a tire pressure sensor according to an embodiment of the present application. As shown in FIG. 13, the tire pressure sensor includes a signal receiving module 1301, a memory 1302, a programming and upgrading module 1303 and a tire pressure monitoring module 1304.

The signal receiving module 1301 may be a wireless receiving module, which may communicate with an external terminal through a wireless network. The external terminal may be a programming apparatus for the tire pressure sensor, such as a vehicle diagnostic equipment, a tire pressure dedicated tool, or a tire pressure programming tool, which is not limited herein. The signal receiving module 1301 may be a low frequency receiving module, configured to receive a low frequency signal carrying an upgrade file based on a communication protocol with the external terminal. The signal receiving module 1301 may be implemented by an apparatus such as a wireless communications interface, which is not limited herein. In an embodiment, the signal receiving module 1301 is a low frequency (LF) receiver. In another embodiment, the signal receiving module 1301 is a WiFi interface or a Bluetooth interface for wirelessly receiving the upgrade file.

The memory 1302 is connected to the signal receiving module 1301, and may be configured to save the upgrade file received by the signal receiving module 1301. The memory may be a volatile memory, such as a random-access memory (RAM), for example, a static random-access memory (SRAM) or a double data rate synchronous dynamic random access memory (DDR SDRAM). The memory may be a non-volatile memory, such as a flash memory, a hard disk drive (HDD), a solid-state drive (SSD) or an electrically erasable programmable read only memory (EEPROM). In an embodiment, the memory 1302 stores programming files for varies vehicle makes and models.

The programming and upgrading module 1303 may be connected to the signal receiving module 1301 and the memory 1302. After receiving and saving data in the memory 1302, the signal receiving module 1301 may send a trigger signal to the programming and upgrading module 1303 to trigger the programming and upgrading module 1303 to read the upgrade file in the memory 1302 and upgrade the tire pressure monitoring module 1304 based on the upgrade file. The programming and upgrading module 1303 may be implemented by an apparatus such as a controller or a processor. In some other embodiment, the programming and upgrading module 1303 is a software module loaded by the tire pressure monitoring module 1304.

In an embodiment, the tire pressure monitoring module 1304 may be connected to the programming and upgrading module 1303. The tire pressure monitoring module 1304 may enter a start mode under control of the programming and upgrading module. Further, the programming and upgrading module 1303 may upgrade the tire pressure monitoring module 1304. The tire pressure monitoring module 1304 may be implemented by a tire pressure monitoring chip or the like. In an embodiment, the tire pressure monitoring module 1304 is a micro-controller having a rewritable memory, such as a rewritable flash memory.

It should be noted that the method in the embodiments of the present application that is implemented by tire foregoing modules may be implemented by hardware and software in the modules. To be specific, the method in the embodiments of the present application may be implemented by hardware running software, which is not limited herein.

With the configuration of the programming and upgrading module and the memory in the tire pressure sensor, the upgrade file received by the signal receiving module can be saved and the tire pressure monitoring module can be triggered to enter the start mode, so that the tire pressure monitoring module can be upgraded based on the saved upgrade file. In this way, wireless upgrading of the tire pressure sensor can be implemented, thereby simplifying the upgrading operations of the tire pressure sensor.

The following describes a method provided in an embodiment of the present application based on the above structure of the tire pressure sensor.

FIG. 1 is a schematic flowchart of an upgrading method for a tire pressure monitoring, module according to an embodiment of the present invention. The upgrading method for a tire pressure monitoring module is applicable to a tire pressure sensor. This embodiment includes:

Step S100. A signal receiving module receives an upgrade file and saves the upgrade file.

In specific implementation, the signal receiving module in the tire pressure sensor receives the upgrade file sent by an external apparatus. The signal receiving module is a low frequency receiving module such as a low frequency inductor. The upgrade file may be transmitted to the low frequency receiving module of the tire pressure sensor at a low frequency. In some other embodiments, the upgrade file may be transmitted to the tire pressure sensor through other channels. The upgrade file may be from the external apparatus. Alternatively, the tire pressure sensor is connected to a cloud server, and when detecting that the tire pressure monitoring module has a new upgrade file for updating, the cloud server transmits the upgrade file to the tire pressure sensor. The tire pressure sensor saves the upgrade file after obtaining the upgrade file. Generally, a location to which the upgrade file is saved may be preset.

The upgrade file is generally a programming upgrade file. The programming upgrade file is an offline update package. The offline update package is installer. Installation content corresponding to the installer is an updating part. For a file that does not change, a previously installed version is directly used. The programming upgrade file may further modify some system configurations to adapt to a function of a new version. The following embodiments are described through an example in which the upgrade file is a programming upgrade file.

Step S200. The signal receiving module sends a trigger signal to a programming and upgrading module after saving the upgrade file.

After receiving the trigger signal, the programming and upgrading module controls the tire pressure monitoring module to enter an upgrade mode.

The programming and upgrading module reads the upgrade file from a memory and upgrades the tire pressure monitoring module in the upgrade mode based on the upgrade file.

In an embodiment, the upgrade file may include a plurality of upgrading packages. The signal receiving module may successively receive the upgrading packages of the upgrade file and save the upgrading packages in the memory, until all the upgrading packages of the upgrade file are saved. The signal receiving module may send a trigger signal to the programming and upgrading module. The trigger signal may be used for triggering the programming and upgrading module to control the tire pressure monitoring module to enter the upgrade mode.

Optionally, the trigger signal may be a wakeup signal. The programming and upgrading module may usually be in a sleep mode. After receiving the wakeup signal, the programming and upgrading module enters a working mode and therefore can control the tire pressure monitoring module. In this way, power consumption of the tire pressure sensor can be reduced.

Optionally, the signal receiving module may send the trigger signal to the programming and upgrading module through an interrupt or message queue, which is not limited herein.

After receiving the trigger signal, the programming and upgrading module may control the tire pressure monitoring module to enter the upgrade mode (that is, an upgrading state). For example, the programming and upgrading module sends an upgrade signal to the tire pressure monitoring module to control the tire pressure monitoring module to enter the upgrade mode. Controlling the tire pressure monitoring module to enter the upgrade mode may also be understood as waking up the tire pressure monitoring module. Specifically, waking up the tire pressure monitoring module means changing the tire pressure monitoring module from a tire pressure monitoring state to the upgrading state. After the tire pressure monitoring module is woken up, the programming and upgrading module may read the upgrade file saved in the tire pressure sensor and perform programming and upgrading of the tire pressure monitoring module based on the upgrade file, thus implementing wireless upgrading of the tire pressure monitoring module.

Optionally, in an implementation, if the tire pressure monitoring module needs to be powered off before entering the upgrade mode (that is, the upgrading state), the controlling the tire pressure monitoring module to enter the upgrade mode by the programming and upgrading module may be implemented by: first controlling the tire pressure monitoring module to power off and then sending the upgrade signal to the tire pressure monitoring module to cause the tire pressure monitoring module to enter the upgrade mode. In other words, in the power off state, the tire pressure monitoring module allows the programming and upgrading module to perform an erase and write operation on a flash or other storage unit configured therein.

Further, after upgrading the tire pressure monitoring module, the programming and upgrading module may control the tire pressure monitoring module to power on.

Figure 2:
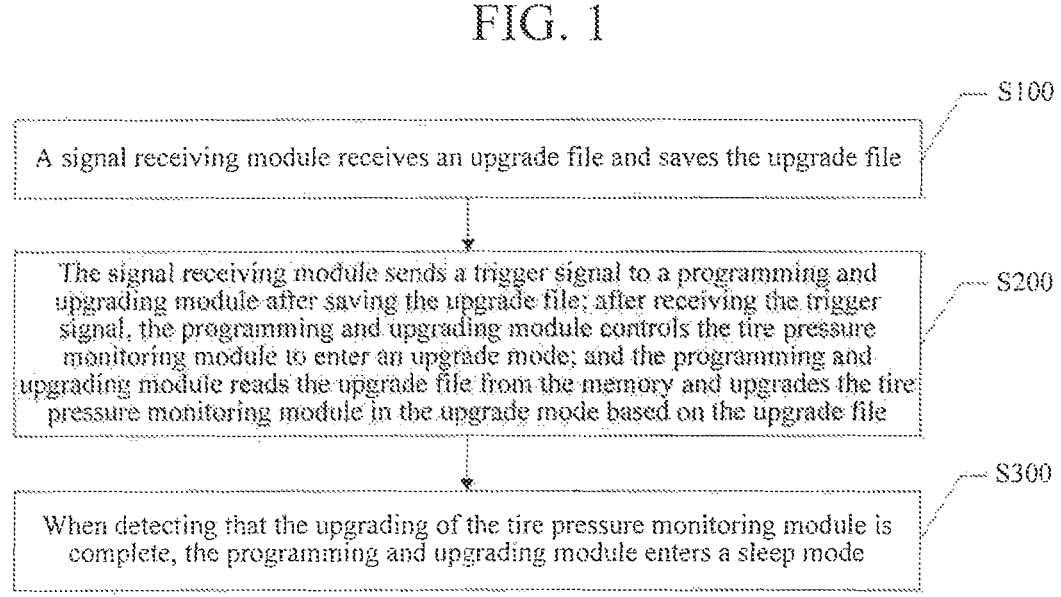
FIG. 2 is a schematic flowchart of an upgrading method for a tire pressure monitoring module according to another embodiment of the present invention.

Optionally, FIG. 2 is a schematic flowchart of an upgrading method for a tire pressure monitoring module according to another embodiment of the present invention. In addition to step S100 and step S200 in FIG. 1, after step S200, the method further includes:

Step S300. When detecting that the upgrading of the tire pressure monitoring module is complete, the programming and upgrading module enters a sleep mode.

In specific implementation, when detecting that the upgrading of the tire pressure monitoring module is complete, the programming and upgrading module may automatically enter the sleep mode, ensuring low power consumption of the tire pressure sensor.

Figure 3:
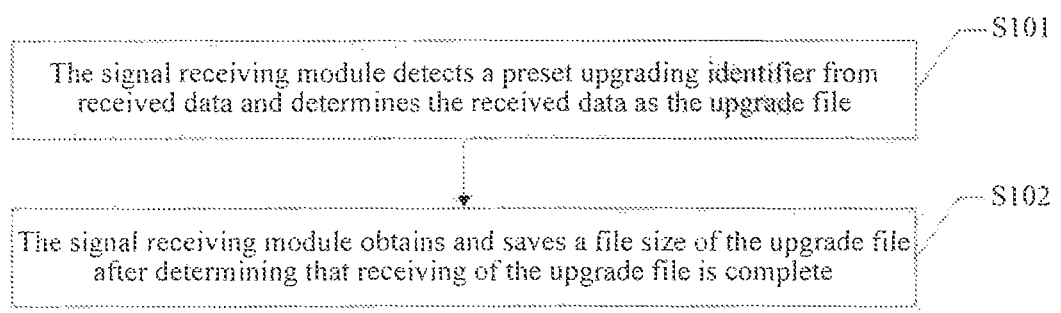
FIG. 3 is a schematic flowchart of an implementation of step S100 in FIG. 1.

Optionally, FIG. 3 is a schematic flowchart of step S100 in FIG. 1. As shown in FIG. 3, after step S100, the method further includes:

Step S101. The signal receiving module detects a preset upgrading identifier from received data and determines the received data as the upgrade file. Step S102. The signal receiving module obtains and saves a file size of the upgrade file after determining that receiving of the upgrade file is complete.

In specific implementation, the main work of a sensor is monitoring an internal status of a tire. Programming and upgrading is one of the functions. Therefore, identifiers need to be preset to distinguish different functions. To be specific, the signal receiving module distinguishes the upgrade file and other data by using the preset identifiers. For example, the other data may be an activation signal sent by an external device to a tire pressure monitoring apparatus, so that the tire pressure monitoring apparatus may be activated. Alternatively, the other data may be data exchanged between the external apparatus and the tire pressure monitoring module, and so on. The signal receiving module may determine the received data as upgrade data after detecting a preset upgrading identifier from the received data. Alternatively, the signal receiving module first receives an identifier and after determining the identifier as the upgrading identifier, starts to receive a programming upgrade file. The programming upgrade file may be of a large size and need to be transmitted and saved in multiple parts. After the transmission and the saving of the programming upgrade file are complete, a size of the programming upgrade file is written to a particular address in the storage unit, for ease of determining whether the programming and upgrading operation is finished.

Further, the programming and upgrading module may further read the upgrade file based on the written size of the upgrade file.

For example, the programming and upgrading module may read all or part of the upgrade file from the memory based on the written size of the upgrade file.

For example, the programming and upgrading module may further determine an amount of data the tire pressure monitoring module is able to upgrade each time, determine a number of times of reading based on the amount of data and the size of the upgrade file and successively read the upgrade data in the upgrade file based on the number of times of reading.

Specifically, the programming and upgrading module may read, from the upgrade file, upgrade data of a size equal to the amount of data the tire pressure monitoring module is able to upgrade each time, and upgrade the tire pressure monitoring module; and after the upgrading is finished, read upgrade data of the same size from the upgrade file and upgrade the tire pressure monitoring module; and repeat this process, until the upgrading of the tire pressure monitoring module is finished.

Figure 4:
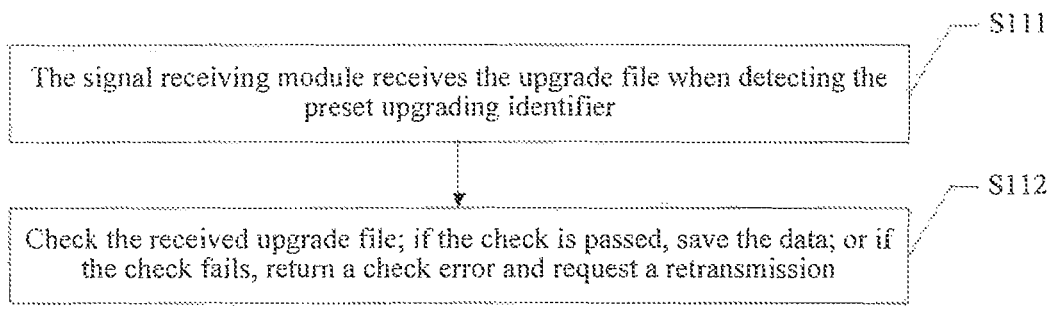
FIG. 4 is a schematic flowchart of an implementation of step S101 in FIG. 3.

Optionally, FIG. 4 is a schematic flowchart of an implementation of step S101 in FIG. 3. As shown in FIG. 4, step S101 includes:

Step S111. The signal receiving module receives the upgrade file when detecting the preset upgrading identifier.

Optionally, this step may be replaced with the following step:

the signal receiving module detects whether the preset upgrading identifier exists in the received data, and if the preset upgrading identifier exists, determines the received data as the upgrade data.

Step S112. Check the received upgrade file; if the check is passed, save the data, or if the check fails, returns a check error and request a retransmission.

In specific implementation, the signal receiving module is controlled to start to receive the programming upgrade file only after a preset programming and upgrading identifier is detected. During the transmission of the programming upgrade file, a data check (such as CRC32) is added to each package of data. The tire pressure monitoring module checks the received data according to a preset algorithm; and if the check is passed, saves the data, or otherwise, returns a check error and requests a retransmission. The last package of data includes a data check of the entire programming upgrade file in order for the tire pressure sensor to check and make a judgment.

Figure 5:
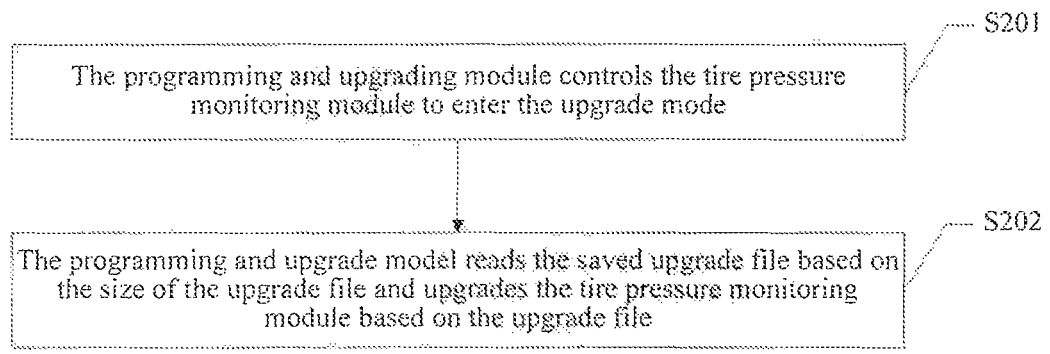
FIG. 5 is a schematic flowchart of an implementation of step S200 in FIG. 1.

Optionally, FIG. 5 is a schematic flowchart of an implementation of step S200 in FIG. 1. As shown in FIG. 5, step S200 includes:

Step S201. The programming and upgrading module controls the tire pressure monitoring module to enter the upgrade mode.

Step S202. The programming and upgrading module reads the saved upgrade file based on the size of the upgrade file and upgrades the tire pressure monitoring module based on the upgrade file.

For specific descriptions of this embodiment of the present application, refer can be made to the foregoing embodiments, and the details are not described herein again.

Figure 6:
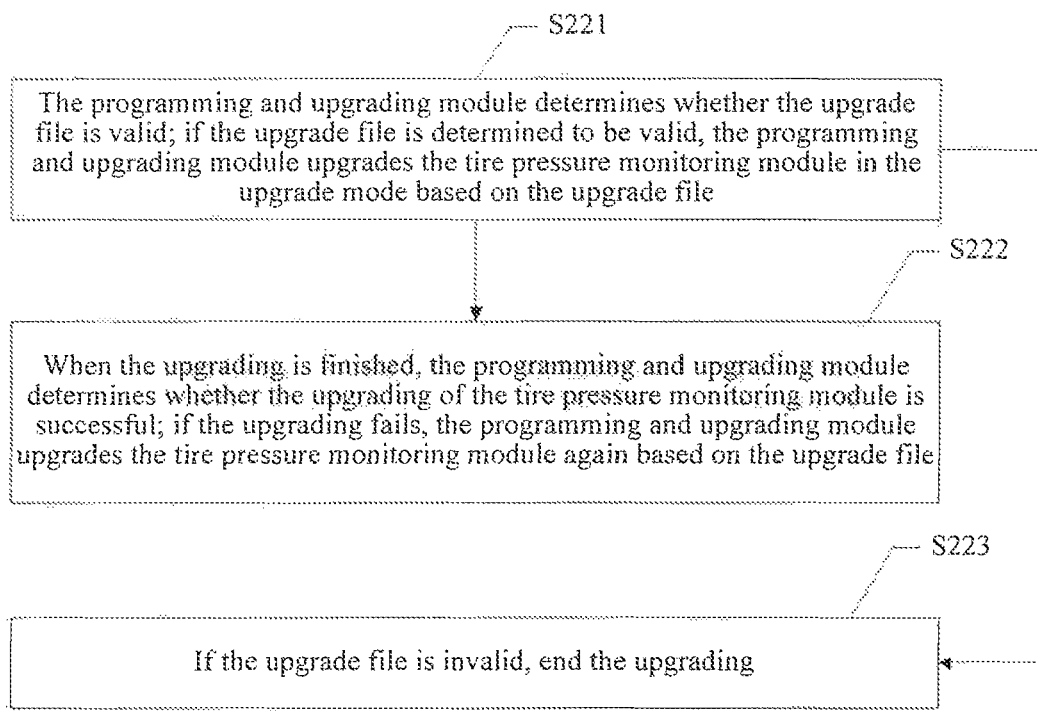
FIG. 6 is a schematic flowchart of an implementation of step S202 in FIG. 5.

Optionally, FIG. 6 is a schematic flowchart of an implementation of step S202 in FIG. 5. As shown in FIG. 6, step S202 includes:

Step S221. The programming and upgrading module determines whether the upgrade file is valid; if the upgrade file is determined to be valid, the programming and upgrading module upgrades the tire pressure monitoring module in the upgrade mode based on the upgrade file.

Step S222. When the upgrading is finished, the programming and upgrading module determines whether the upgrading of the tire pressure monitoring module is successful; if the upgrading fails, the programming and upgrading module upgrades the tire pressure monitoring module again based on the upgrade file.

Step S223. If the upgrade file is invalid, end the upgrading.

In specific implementation, the programming and upgrading module may determine whether the upgrade file is valid before upgrading the tire pressure monitoring module, that is, perform a validity check to check the entire programming upgrade file; and if the check is passed, perform the programming and upgrading operation, or otherwise, exit the process to end the programming and upgrading.

Further, when the upgrading is finished, the programming and upgrading module may determine whether the upgrading of the tire pressure monitoring module is successful, that is, determine whether the upgrading of the tire pressure monitoring module is successful based on a check result of data or file that is updated based on the upgrade file in the tire pressure monitoring module. If the check is passed, it indicates that the programming and upgrading is complete. Otherwise, the programming and upgrading module may perform programming and upgrading again for the tire pressure monitoring module.

The upgrading method provided in the embodiments of the present application is described below based on an application scenario.

An existing SP37 tire pressure monitoring chip is used as an example to describe a specific implementation of the upgrading method. Definitions are given in advance: SP37: the model number of a tire pressure monitoring chip, produced by the company Infineon; LF: low frequency; Port Pin I/O 0 (PP0): input/output interface pin 0; Port Pin I/O 1 (PP1): input/output interface pin 1.

The SP37 tire pressure monitoring chip has upgrading defects in the foregoing application scenario. Before the programming and upgrading, the SP37 chip needs to enter a programming and upgrade mode first. Specific operations are as follows: (1) disconnecting the SP37 chip from the power supply, setting PP0 and PP1 to logic 0 and maintaining for one second; and (2) setting PP0 to logic 0, setting PP1 to logic 1, connecting the SP37 chip to the power supply and maintaining the state for one second. After the programming and upgrading of the SP37 chip is complete, the SP37 chip needs to exit the programming and upgrade mode through a series of operations. Specific operations are as follows: (1) setting PP0 and PP1 to logic 1 and maintaining for one second; (2) disconnecting the SP37 chip from the power supply, setting PP0 and PP1 to logic 0 and maintaining for one second; and (3) connecting the SP37 chip to the power supply, setting PP0 and PP1 to logic 1 and maintaining for one second.

The SP37 chip needs to be power off both when entering the programming and upgrade mode and when exiting the programming and upgrade mode. The power off operation cannot be implemented by the SP37 chip itself.

According to an embodiment of the present application, a programming and upgrading module may be configured inside the sensor, to perform a mode switching operation and a programming and upgrading operation for the SP37 chip. The SP37 chip receives the programming upgrade file through its LF receiver and saves the programming upgrade file in a memory configured in the sensor to ensure that the upgrade file will not lost after the SP37 chip is powered off. The programming and upgrading module is instructed to perform the programming and upgrading after the receiving is complete. The programming and upgrading module first switches the SP37 chip to the programming and upgrade mode for programming and upgrading, and after the programming and upgrading is finished, causes the SP37 chip to exit the upgrade mode. The programming upgrade module enters a sleep mode to ensure low power consumption.

Figure 7:
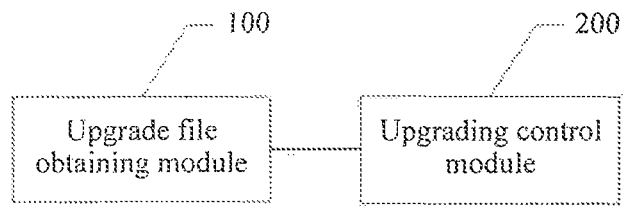
FIG. 7 is a schematic functional structural diagram of an upgrading apparatus for a tire pressure monitoring module according to an embodiment of the present invention.

FIG. 7 is a schematic functional structural diagram of an upgrading apparatus for a tire pressure monitoring module according to an embodiment of the present invention. The upgrading apparatus for a tire pressure monitoring module is applicable to a tire pressure sensor including a signal receiving module. As shown in FIG. 7, the apparatus includes:

an upgrade file obtaining module 100, configured to control the signal receiving module to receive the upgrade file and save the upgrade file; and an upgrading control module 200, configured to wake up the tire pressure monitoring module, and control the tire pressure monitoring module to read the saved upgrade file and upgrade the tire pressure monitoring module based on the upgrade file.

In specific implementation, the signal receiving module in the tire pressure sensor receives the upgrade file. The signal receiving module is a low frequency receiving module such as a low frequency inductor. The upgrade file may be transmitted to the low frequency receiving module of the tire pressure sensor at a low frequency. In some other embodiments, the upgrade file may be transmitted to the tire pressure sensor through other channels. The upgrade file may be from another intelligent terminal; or the tire pressure sensor is connected to a cloud server, and when detecting that the tire pressure monitoring module has a new upgrade file for updating, the cloud server transmits the upgrade file to the tire pressure sensor. The tire pressure sensor saves the upgrade file after obtaining the upgrade file. Generally, a location to which the upgrade file is saved may be preset. The upgrade file is generally a programming upgrade file. The programming upgrade file is offline update packages. The offline update packages are installers. Installation contents corresponding to the installers are updating parts. For a file that does not change, a previously installed version is directly used. The programming upgrade file may further modify some system configurations to adapt to functions of a new version. The following embodiments are described through an example in which the upgrade file is a programming upgrade file.

After the upgrade file is obtained, the tire pressure monitoring module is woken up. Specifically, waking up the tire pressure monitoring module means changing the tire pressure monitoring module from a tire pressure monitoring state to an upgrading state. After the tire pressure monitoring module is woken up, the upgrade file saved in the tire pressure sensor is obtained and read, and programming and upgrading of the tire pressure monitoring module is performed based on the upgrade file, thus implementing wireless upgrading of the tire pressure monitoring module.

Figure 8:
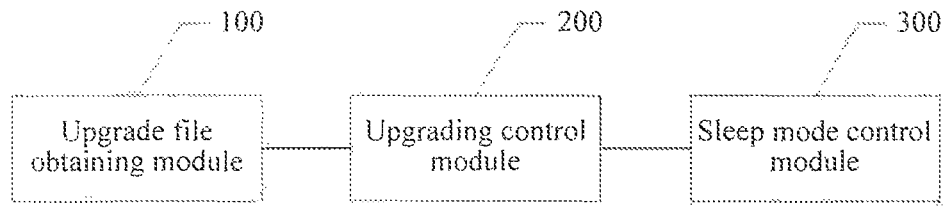
FIG. 8 is a schematic functional structural diagram of an upgrading apparatus for a tire pressure monitoring module according to another embodiment of the present invention.

Optionally, FIG. 8 is a schematic functional structural diagram of an upgrading apparatus for a tire pressure monitoring module according to another embodiment of the present invention. As shown in FIG. 8, the apparatus further includes:

a sleep mode control module 300, configured to control the tire pressure sensor to enter the sleep mode, after detecting that the upgrading of the tire pressure monitoring module is complete.

In specific implementation, the tire pressure sensor is controlled to enter the sleep mode automatically when detecting that the upgrading of the tire pressure monitoring module is complete, ensuring the low power consumption of the tire pressure sensor.

Figure 9:
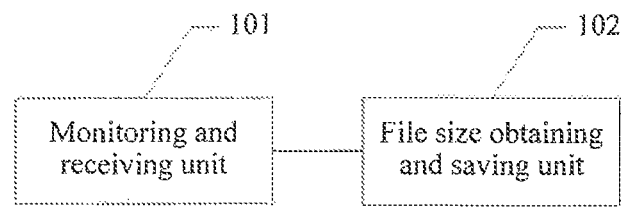
FIG. 9 is a schematic functional structural diagram of an upgrade file obtaining module 100 in FIG. 7.

Optionally, FIG. 9 is a schematic functional structural diagram of the upgrade file obtaining unit 100 in FIG. 7. As shown in FIG. 9, the upgrade file obtaining module 100 includes:

a monitoring and receiving unit 101, configured to control the signal receiving module to receive the upgrade file and save the upgrade file when detecting a preset upgrading identifier;

a file size obtaining and saving unit 102, configured to obtain and save a file size of the upgrade file when detecting that the transmission of the upgrade file is complete.

In specific implementation, the main work of a sensor is monitoring an internal status of a tire. Programming and upgrading is one of the functions. Therefore, identifiers need to be preset to distinguish different functions. The signal receiving module is controlled to start to receive the programming upgrade file only after a preset programming and upgrading identifier is detected. The programming upgrade file may be of a large size and need to be transmitted and saved in multiple parts. After the transmission and the saving of the programming upgrade file are complete, a size of the programming upgrade file is written into a particular address in the storage unit, for ease of determining whether the programming and upgrading operation is finished.

Figure 10:
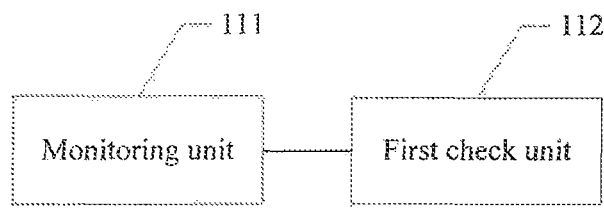
FIG. 10 is a schematic functional structural diagram of a monitoring and receiving unit 101 in FIG. 9.

Optionally, FIG. 10 is a schematic functional structural diagram of the monitoring and upgrading unit 101 in FIG. 9. As shown in FIG. 10, the monitoring and receiving unit 101 includes:

a monitoring unit 111, configured to control, when detecting the preset upgrading identifier, the signal receiving module to receive the upgrade file;

a first check unit 112, configured to check the received upgrade file; and if the check is passed, save the data, or if the check fails, return a check error and request a retransmission.

In specific implementation, the signal receiving module is controlled to start to receive the programming upgrade file only after a preset programming upgrading identifier is detected. During the transmission of the programming upgrade file, a data check (such as CRC32) is added to each package of data. The tire pressure monitoring module checks the received data according to an agreed algorithm; and if the check is passed, saves the data, or otherwise, returns a check error and requests a retransmission. The last package of data includes a data check of the entire programming upgrade file in order for the tire pressure sensor to check and make a judgment.

Figure 11:
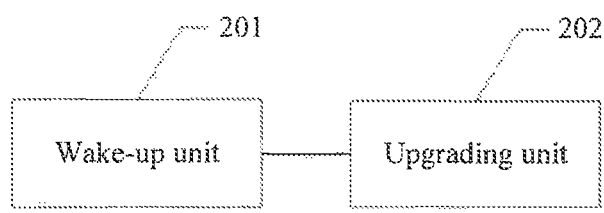
FIG. 11 is a schematic functional structural diagram of an upgrading control module 200 in FIG. 7.

Optionally, FIG. 11 is a schematic functional structural diagram of the upgrading control module 200 in FIG. 7. As shown in FIG. 11, the upgrading control module 200 includes:

a wake-up unit 201, configured to, after receiving a valid upgrading wakeup signal, wake up the tire pressure monitoring module and control the tire pressure monitoring module to enter the upgrade mode;

an upgrading unit 202, configured to read the saved upgrade file based on the size of the upgrade file and upgrade the tire pressure monitoring module based on the upgrade file.

In specific implementation, if the receiving of the upgrade file is finished and the transmission of the upgrade file is normal, the tire pressure sensor sends a valid upgrading wakeup signal to wake up the tire pressure monitoring module. The upgrading wakeup signal is a particular programming and upgrading notification sent by the tire pressure sensor; if the programming upgrade file is valid, a programming and upgrading operation is performed subsequently, or otherwise, the tire pressure monitoring module directly enters the sleep mode and exists the programming and upgrade mode. The programming and upgrading operation includes first initializing the tire pressure monitoring module to cause the tire pressure monitoring module to enter the programming and upgrade mode to allow an external device to perform programming and upgrading for the tire pressure monitoring module, and then reading the size of the programming upgrade file saved in the storage unit. If the file size is greater than a size the tire pressure monitoring module is able to program and upgrade each time, the programming upgrade file needs to be read in multiple parts. After the programming and upgrading is completed, the tire pressure sensor enters the sleep mode to ensure low power consumption.

Figure 12:
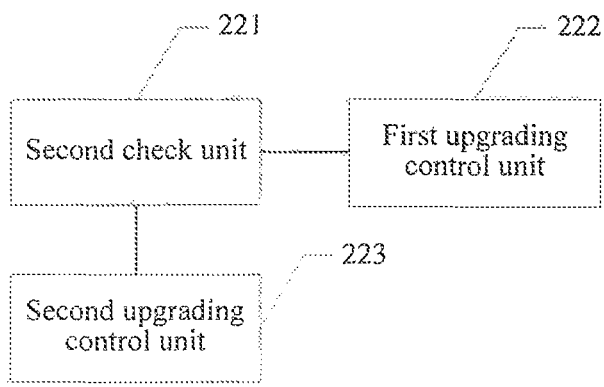
FIG. 12 is a schematic functional structural diagram of an upgrading unit 202 in FIG. 11.

Optionally, FIG. 12 is a schematic functional structural diagram of the upgrading unit 202 in FIG. 11. As shown in FIG. 12, the upgrading unit 202 includes:

a second check unit 221, configured to read the saved upgrade file based on the size of the upgrade file and check the upgrade file;

a first upgrading control unit 222, configured to: if the check of the upgrade file is passed, start an upgrading operation for the tire pressure monitoring module based on the upgrade file; when the upgrading is finished, check an upgrading result of the tire pressure monitoring module; and if the check of the upgrading result is passed, determine that the upgrading is complete, or if the check of the upgrading result fails, perform the upgrading operation for the tire pressure monitoring module again; and a second upgrading control unit 223, configured to end the upgrading if the check of the upgrade file fails.

In specific implementation, a validity check is performed before programming to check the entire programming upgrade file. Only when the check is passed, can the programming and upgrading operation be performed. Otherwise, exit the process to end the programming and upgrading. When the updating of the programming upgrade file is finished, an erasable area of the tire pressure monitoring module is checked. If the check is passed, it indicates that the programming and upgrading is complete; otherwise, programming and upgrading need to be performed for the tire pressure monitoring module again.

It should be noted that the functional units may be implemented by the modules or a combination of the modules in FIG. 13. No limitation is imposed herein.

The apparatus embodiments described above are merely schematic. The units described as separate parts may be or may not be physically apart. The parts displayed as units may be or may not be physical units, in other words, may be located at a same place, or may be distributed onto a plurality of network units. Some or all modules thereof may be selected based on actual requirements, to achieve the objectives of the solutions in the embodiments.

Through the description of the foregoing embodiments, a person skilled in the art may clearly understand that the embodiments may be implemented by software in combination with a universal hardware platform, and may certainly be implemented by hardware. Based on such an understanding, the technical solutions essentially or the part contributing to the related art may be implemented in a form of a computer software product. The computer software product may be stored in a storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments.

The foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. A tire pressure sensor, comprising:
a wireless interface configured to wirelessly receive an upgrade file;
a first memory connected to the wireless interface and configured to save the upgrade file;
a programming and upgrading module connected to the wireless interface and the first memory; and
a tire pressure monitoring module connected to the programming and upgrading module, the tire pressure monitoring module having a second memory, the second memory being rewritable;
wherein the wireless interface is configured to send a trigger signal to the programming and upgrading module;
wherein the programming and upgrading module is configured to control, after receiving the trigger signal, the tire pressure monitoring module to enter an upgrade mode;
wherein the programming and upgrading module is configured to read the upgrade file from the first memory and upgrade the tire pressure monitoring module in the upgrade mode based on the upgrade file.

2. The tire pressure sensor according to claim 1, wherein the trigger signal is a wakeup signal for waking up the programming and upgrading module in a sleep mode.

3. The tire pressure sensor according to claim 1, wherein the wireless interface is configured to detect a preset upgrading identifier from received data and determine the received data as the upgrade file.

4. The tire pressure sensor according to claim 1, wherein the wireless interface is configured to obtain and save a file size of the upgrade file after determining that receiving of the upgrade file is complete;
wherein the programming and upgrading module is configured to read the upgrade file based on the file size of the upgrade file.

5. The tire pressure sensor according to claim 4, wherein the programming and upgrading module is configured to:

determine a number of times of reading based on the file size of the upgrade file and an amount of data the tire pressure monitoring module is able to upgrade each time; and read upgrade data in the upgrade file successively based on the number of times of reading.

6. The tire pressure sensor according to claim 1, wherein the programming and upgrading module is configured to:
control the tire pressure monitoring module to power off; and
send an upgrade signal to the tire pressure monitoring module to cause the tire pressure monitoring module to enter the upgrade mode.

7. The tire pressure sensor according to claim 1, wherein the programming and upgrading module is configured to:
determine whether the upgrade file is valid; and
if the upgrade file is determined to be valid, upgrade the tire pressure monitoring module in the upgrade mode based on the upgrade file.

8. The tire pressure sensor according to claim 1, wherein the programming and upgrading module is configured to:
determine whether the upgrading of the tire pressure monitoring module is successful; and
if the upgrading fails, upgrade the tire pressure monitoring module again based on the upgrade file.

9. The tire pressure sensor according to claim 1, wherein the programming and upgrading module is configured to enter the sleep mode after upgrading the tire pressure monitoring module.

10. A tire pressure sensor, comprising:
a wireless interface configured to wirelessly receive an upgrade file from an external apparatus;
a first memory connected to the wireless interface;
a tire pressure monitoring module having a second memory, the second memory being rewritable;
wherein the tire pressure monitoring module is configured to:
write the upgrade file in the second memory based on a determination that the tire pressure monitoring module enters an upgrade mode; and
upgrade based on the upgrade file in the upgrade mode.

11. The tire pressure sensor according to claim 10, wherein the first memory is configured to store the upgrade file.

12. The tire pressure sensor according to claim 10, wherein the tire pressure monitoring module is from a mode of monitoring a tire pressure to the upgrade mode.

13. The tire pressure sensor according to claim 10, wherein the wireless interface is a low frequency receiver.

14. An upgrading method performed by a tire pressure sensor, wherein the tire pressure sensor comprises a signal receiving module, a tire pressure monitoring module, a programming and upgrading module and a first memory, the tire pressure monitoring module having a second memory, the second memory being rewritable;
wherein the method comprises:
wirelessly receiving an upgrade file by the signal receiving module;
saving the upgrade file in the first memory;
sending, by the signal receiving module, a trigger signal to the programming and upgrading module after saving the upgrade file;
controlling, by the programming and upgrading module, the tire pressure monitoring module to enter an upgrade mode after receiving the trigger signal; and
reading, by the programming and upgrading module, the upgrade file from the first memory; and
upgrading the tire pressure monitoring module in the upgrade mode based on the upgrade file.

15. The method according to claim 14, wherein the trigger signal is a wakeup signal for waking up the programming and upgrading module in a sleep mode.

16. The method according to claim 14, wherein the method further comprises:
detecting, by the signal receiving module, a preset upgrading identifier from received data and determining the received data as the upgrade file; and
obtaining and saving, by the signal receiving module, a file size of the upgrade file after determining that receiving of the upgrade file is complete;
wherein the reading, by the programming and upgrading module, the upgrade file comprises:
reading, by the programming and upgrading module, the upgrade file based on the file size of the upgrade file.

17. The method according to claim 16, wherein the reading, by the programming and upgrading module, the upgrade file based on the file size of the upgrade file comprises:
determining, by the programming and upgrading module, a number of times of reading based on the file size of the upgrade file and an amount of data the tire pressure monitoring module is able to upgrade each time; and
reading upgrade data in the upgrade file successively based on the number of times of reading.

18. The method according to claim 14, wherein the controlling, by the programming and upgrading module, the tire pressure monitoring module to enter the upgrade mode comprises:
controlling, by the programming and upgrading module, the tire pressure monitoring module to power off; and
sending, by the programming and upgrading module, an upgrade signal to the tire pressure monitoring module to cause the tire pressure monitoring module to enter the upgrade mode.

19. The method according to claim 14, wherein the method further comprises:
determining, by the programming and upgrading module, whether the upgrade file is valid;
wherein the upgrading, by the programming and upgrading module, the tire pressure monitoring module in the upgrade mode based on the upgrade file comprises:
if the upgrade file is determined to be valid, upgrading, by the programming and upgrading module, the tire pressure monitoring module in the upgrade mode based on the upgrade file.

20. The method according to claim 14, further comprising:
entering, by the programming and upgrading module, the sleep mode after upgrading the tire pressure monitoring module.

* * * * *